No. 772,201. PATENTED OCT. 11, 1904.
G. F. ARMSTRONG.
WHEEL AND BEARING FOR TRUCKS.
APPLICATION FILED JAN. 30, 1904.
NO MODEL.

Attest
P. M. Kelly,
Wm. Rooney

Inventor
George F. Armstrong
By his atty

No. 772,201. Patented October 11, 1904.

UNITED STATES PATENT OFFICE.

GEORGE F. ARMSTRONG, OF PHILADELPHIA, PENNSYLVANIA.

WHEEL AND BEARING FOR TRUCKS.

SPECIFICATION forming part of Letters Patent No. 772,201, dated October 11, 1904.

Application filed January 30, 1904. Serial No. 191,243. (No model.)

*To all whom it may concern:*

Be it known that I, GEORGE F. ARMSTRONG, of the city and county of Philadelphia, State of Pennsylvania, have invented an Improvement in Wheels and Bearings for Trucks and other Purposes, of which the following is a specification.

My invention has reference to wheels and bearings for trucks and other purposes; and it consists of certain improvements which are fully set forth in the following specification and shown in the accompanying drawings, which form a part thereof.

The object of my invention is to provide a construction of wheel-axle and bearing in which all machine-fitting is entirely done away with, whereby great economy in construction is assured.

In carrying out my invention I first cast or secure a wheel upon a rod with the ends projecting beyond the faces of the hub, so as to act as journals. This wheel and axle are then combined with a cast frame so cast upon the journals that it holds them in position and forms oil-wells about the ends and under surfaces of the journals.

The construction is such that all parts are accurately combined and in excellent running order by the simple act of casting the frame and bearings upon the journals of the wheel.

My invention also comprehends details of construction, which, together with the above features, will be better understood by reference to the drawings, in which—

Figure 1:
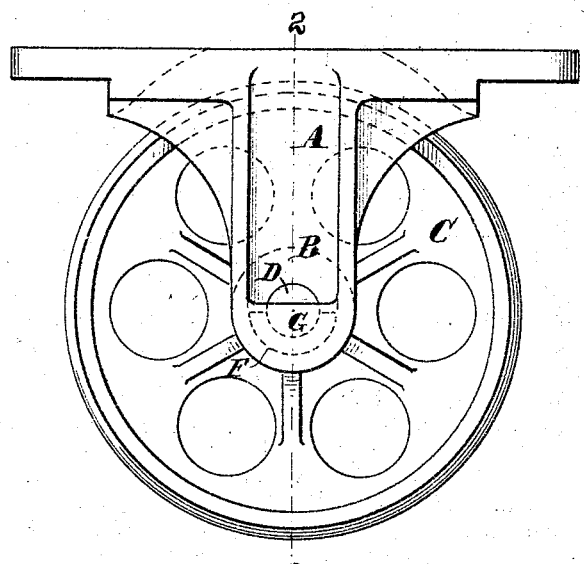
Figure 2:
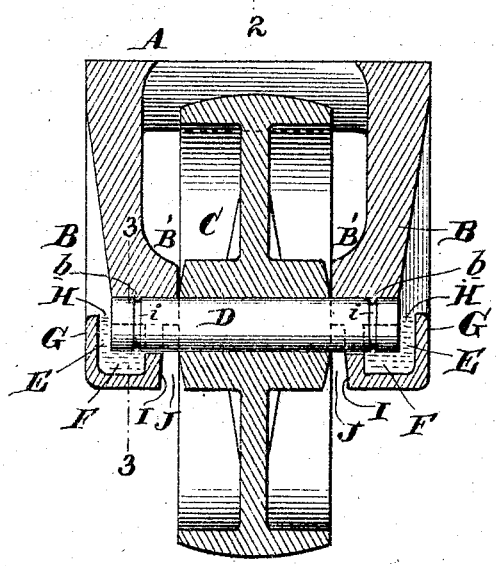
Figure 3:
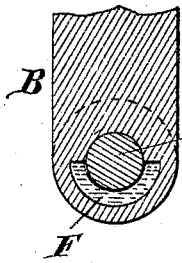

Figure 1 is a side elevation of a wheel and supporting-frame embodying my invention. Fig. 2 is a sectional elevation on line 2 2 of Fig. 1, and Fig. 3 is a vertical section on line 3 3 of Fig. 2.

A is the cast frame, having the downwardly-extending arms B B, in which the journals of the axle D have a bearing with freedom of rotation. This frame A may be of any shape desired to adapt it to the particular use for which the device is to be designed. As shown, it is made flat on top, so as to be received against the under side of the truck-frame.

The wheel C is cast upon a rod D, the projecting ends of which constitute journals. These journals project into bearings B' in the arms B, and the lower parts of said arms are recessed below the journals, as at F, and these chambers extend upward over the ends of the journals, as at E, and are open at the top, as at H, through which the oil or lubricant is introduced. These chambers are formed by the shell G, which is cast integral with the arms, as shown.

The lower and inner portions of the arms B B below the central portion of the journals are recessed, as at I, so that they form open spaces J between the hub of the wheel C and the bearings, the object of which is to prevent twine or fibrous material winding around the journals and interfering with the freedom of revolution of the wheel.

In constructing the bearings upon the journals the wheel C is first cast upon the axle D and the journals so formed are coated with plumbago-paste. The wheel is then placed in the central part of an ordinary three-part flask and buried in the sand. The patterns for making the frame A and arms B are then employed to form the space for the casting and cores are placed on the ends of the journals to form the oil-wells. The outer portions of the flask are then placed in position and the side portions of the arms B and frame A molded. When the cast is made, the cores are removed, leaving the oil-well chambers E F, and upon revolving the wheel C the journals clear themselves of the plumbago coating, and thus have clearance enough to rotate freely.

If desired, the axle may be formed with peripheral grooves $i$, in which internal lugs $b$ are formed in casting the faces of the arms B. These lugs engage the grooves and give increased support and strength against lateral strains.

It will be observed that this structure is formed in operative form without any machine-work at all, and consequently embodies durability and cheapness. Moreover, those portions of the metal of the arms constituting the bearings B' will be more or less of the character of chilled iron, and hence will be very durable.

The general character of the periphery of the wheel C may be made to suit the purpose to which it is applied.

While I have found the construction shown a most excellent embodiment of my invention, the details thereof may be modified without departing from the spirit of the invention.

Having now described my invention, what I claim as new, and desire to secure by Letters Patent, is—

1. In a wheel and bearing for trucks and other articles, the combination of a wheel having journals extending from each side of its hub, with a supporting-frame provided with arms extending upon each side of the wheel having bearings in which the journals revolve, the said arms being cast in an integral structure about the journals and having their bearings of slightly larger diameter than the diameter of the journals, whereby the latter revolve freely in said bearings and in which the said arms are further provided with integral oil-chambers extending downward over the ends of the journals and under the same to form chambers beneath the journals.

2. In a wheel and bearing for trucks and other articles, the combination of a wheel having journals extending from each side of its hub, with a supporting-frame provided with arms extending upon each side of the wheel having bearings in which the journals revolve, the said arms being cast in an integral structure about the journals and having their bearings of slightly larger diameter than the diameter of the journals, whereby the latter revolve freely in said bearings and in which the said arms are further provided with integral oil-chambers extending downward over the ends of the journals and under the same to form chambers beneath the journals, and in which the lower parts of the casting of said arms are also recessed as at I to form a considerable space between the arms and hub of the wheel below the central part of the journals.

3. In a wheel and bearing for trucks and other articles, a transverse shaft having a wheel cast thereon and in which the ends of the shaft extend beyond the hub of the wheel to form two journals, in combination with a supporting-frame having two journal-bearings cast about the journals of the wheel and each provided with an integral part or wall G extending from the bottom upward so as to shield the lower portions of the ends of the journals and form an oil-chamber extending under the said journals.

4. In a wheel and bearing for trucks and other articles, a wheel provided with journals extending laterally from its hub, combined with a frame having arms cast upon the journals and fitting close to each side of the hub and further provided with an oil-chamber extending downward in front of the ends of the journals and laterally under them, said arms and oil-chambers being of one integral casting.

5. In a wheel and bearing for trucks and other articles, a wheel and axle, combined with a frame having arms in which the axle is journaled, said arms being of an integral casting and fitting close to the ends of the hub at points above the center of the axle and recessed as at I to form spaces of considerable width between the said arms and hub at points below the center of the axle.

In testimony of which invention I hereunto set my hand.

GEORGE F. ARMSTRONG.

Witnesses:
ERNEST HOWARD HUNTER,
R. M. KELLY.